United States Patent [19]

Phillips

[11] 4,003,778
[45] Jan. 18, 1977

[54] METHOD OF MAKING SLENDER ROD FOR FISHING RODS

[75] Inventor: Donald F. Phillips, West Granby, Conn.

[73] Assignee: United Technologies Corporation, Hartford, Conn.

[22] Filed: Sept. 15, 1975

[21] Appl. No.: 613,770

Related U.S. Application Data

[62] Division of Ser. No. 519,883, Oct. 31, 1974, Pat. No. 3,953,637.

[52] U.S. Cl. .................... 156/289; 156/296; 156/312; 264/255; 264/259; 264/294; 264/313; 264/319

[51] Int. Cl.[2] ............ B29D 3/02; B29D 31/00; B29G 7/00

[58] Field of Search ......... 156/172, 180, 192, 242, 156/296, 247, 312, 289, 323; 264/230, 213, 313, 319, 331, 231, 236, 347, 319, 264

[56] References Cited

UNITED STATES PATENTS

| | | | |
|---|---|---|---|
| 3,034,566 | 5/1962 | McKay | 156/296 |
| 3,808,078 | 4/1974 | Snellman et al. | 156/166 |
| 3,849,219 | 11/1974 | Hall-Jackson | 156/166 |
| 3,964,952 | 6/1976 | Brie et al. | 156/166 |

*Primary Examiner*—Willard E. Hoag
*Attorney, Agent, or Firm*—John D. Del Ponti

[57] ABSTRACT

There is described a method for forming high modulus, high strength, low density solid tapered composite rods suitable for use as fishing rods and the like. The method comprises the steps of disposing a plurality of resin-impregnated high modulus, high strength, low density fibers such as boron, carbon, polymeric aromatic nylon or the like uniformly about and in parallel relation to a wire mandrel, the fibers being less in number at one end than at the other end to form a green composite tapered rod, compacting the rod to densify and shape it to a preselected configuration, completely encasing the rod within an embracing molding surface, placing the encased green rod within a rigid tube in spaced relation to the walls thereof, filling the space between the enclosed rod and the tube with particulate material to apply uniform peripheral contact pressure along the length of the rod sufficient to laterally restrain the rod during resin cure and thereby ensure alignment of the fibers and heating the rod to cure the resin.

11 Claims, 6 Drawing Figures

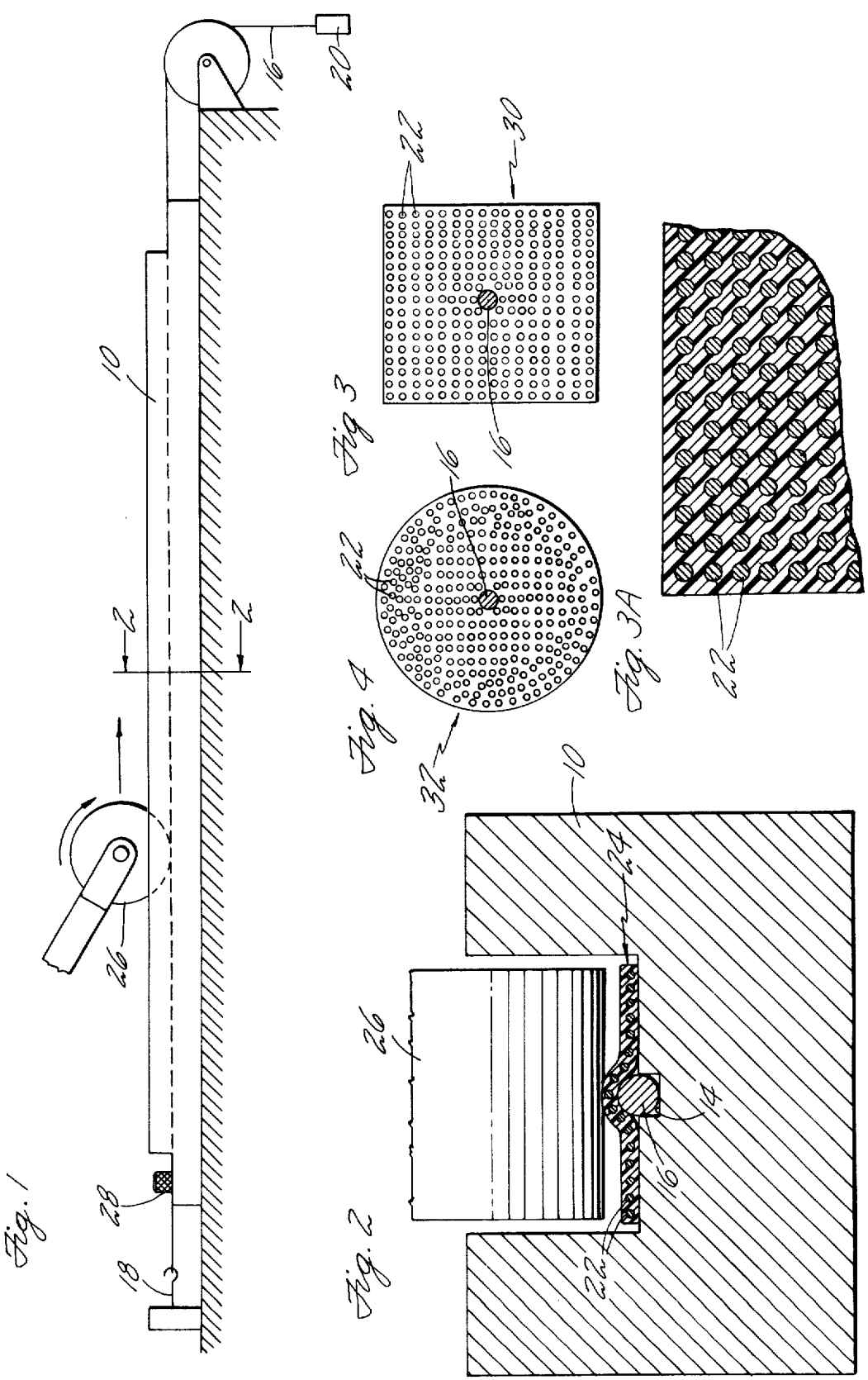

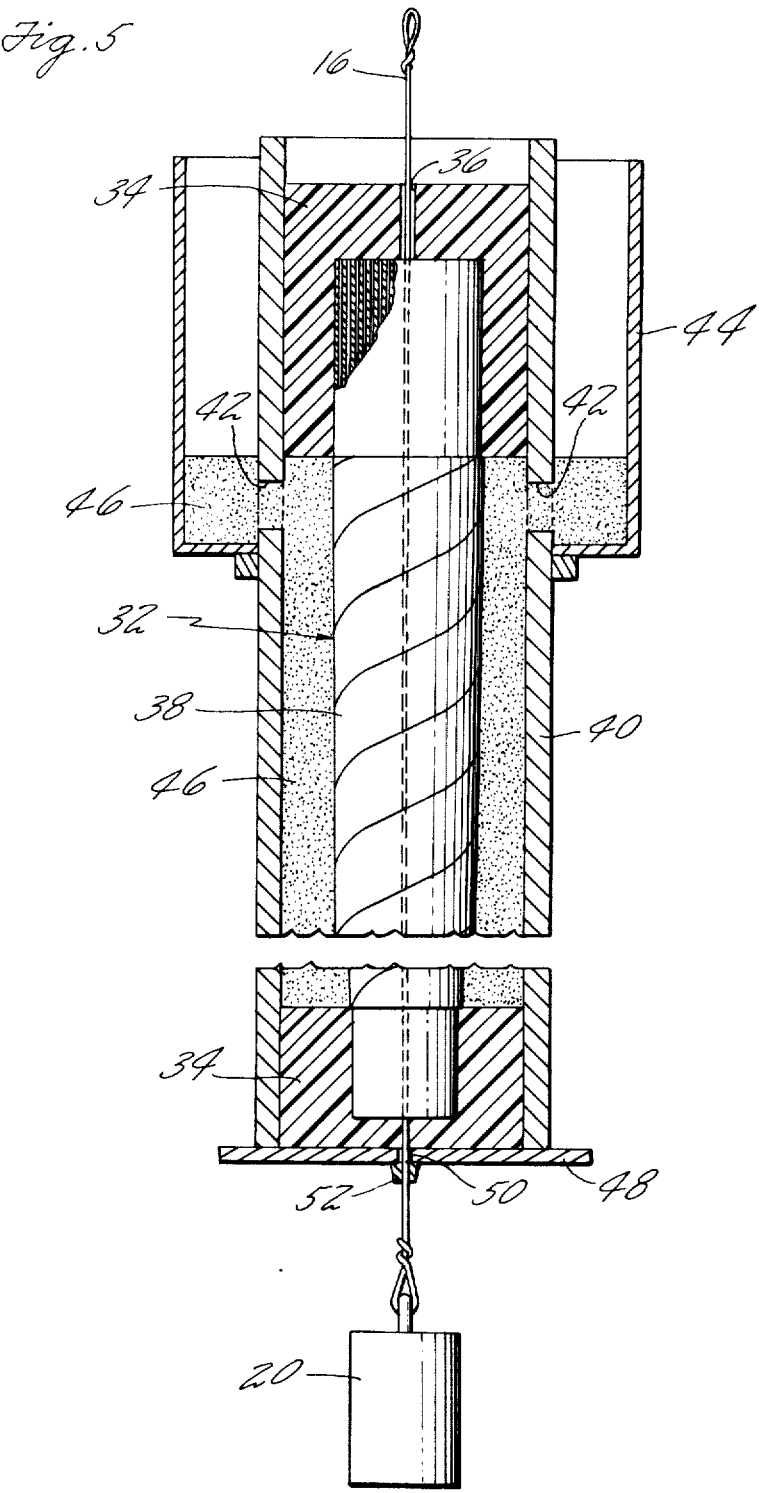

METHOD OF MAKING SLENDER ROD FOR FISHING RODS

This is a division of application Ser. No. 519,883 filed Oct. 31, 1974, and now U.S. Pat. No. 3,953,637.

BACKGROUND OF THE INVENTION

The present invention relates to a process for forming fiber reinforced rods and more particularly relates to a method for making high modulus, high strength, low density slender tapered solid composite rods suitable for use as fishing rods and the like.

Typically, present day high quality fiber glass fly rods are hollow and are constructed by wrapping a resin-impregnated fiber glass cloth over a tapered, removable steel mandrel. After oven curing, the mandrels are removed preparatory to rod finishing. This type of hollow construction is employed in order to reduce rod weight while maintaining appropriate section stiffness. As a result however, the rod diameter is relatively large and tip windage losses during casting are significant.

With the advent of newer, high specific modulus fibers such as boron and graphite, the concept of a cross-sectionally solid rod having acceptable section stiffness without an appreciable weight penalty is feasible. Such a rod would possess both minimum tip windage losses as well as maximum structural integrity against lateral loading.

Although the potential advantages of modern day materials is thus recognized, the problems apparent in utilizing them have remained for solution. While rod construction via tape lay-up may be accomplished in several ways, significant problems arise in the curing of a solid composite green rod since, during this time, it is difficult to restrain the filaments from wandering. The end result can be the occurrence of nonconcentric rod ends, local bulging and/or warping. While it may be speculated that matched dye molding or tapered tube molding would likely solve all of these problems, the large expense due to large L/D ratios, the compound tapers employed in most rods and the large number of different models usually manufactured, renders this technique unattractive.

SUMMARY OF THE INVENTION

It is a general object of the present invention to provide a method for making a high modulus, high strength, low density slender tapered solid composite rod suitable for use in fishing rods or the like which overcomes the problems outlined above.

In accordance with one aspect of the invention, a method for making a solid, tapered fiber-reinforced resin matrix composite rod having a high aspect ratio comprises forming a plurality of resin-impregnated fibers into a handlable, green compact having the shape of a solid tapered composite rod of high aspect ratio, completely encasing said green compact within an embracing molding surface, placing said encased green compact within a rigid tube in spaced relation to the walls thereof, filling the space between said enclosed compact and said tube with particulate material to apply uniform contact pressure along the length of said compact, and heating said rod to harden said resin. Aspect ratio, as applied to rods tapered throughout their length such as those described herein, means the L/D ratio, i.e., the ratio of the length of the rod to the smaller diameter thereof. For the purposes of the present invention the term "high aspect ratio" means an aspect ratio wherein L/D ranges from approximately 400–4,000.

In accordance with a preferred mode of carrying out the present invention, the process comprises the steps of applying a resin to a plurality of high modulus, high strength, low density filaments, disposing said filaments uniformly about and in parallel relationship to a wire mandrel to form a green composite rod, said filaments being less in number at one end of the wire than at the other end, compacting said green rod to densify and shape it to a preselected configuration, completely encasing said green rod within an embracing molding surface, placing said encased green rod within a rigid tube in spaced relation to the walls thereof, filling the space between said enclosed rod and said tube with particulate material in order to apply a uniform peripheral contact pressure along the length of said rod sufficient to laterally restrain the rod during resin cure and ensure alignment of the filaments, and heating said rod to harden the resin. After the green composite rod is heated, it is taken from the tube and the embracing molding surface is removed.

In one aspect of the invention, the embracing molding surface comprises a first cap snugly fitted over one end of the green rod, a second cap snugly fitted over the other end of the green rod and a binding tape wound over the entire surface of the green rod between the first and second end caps. In accordance with another aspect of the invention, the rigid tube is preferably vertically oriented, the filaments are selected from the group consisting of boron, carbon and polymeric aromatic nylon. In a more preferred embodiment of the inventive process, resin impregnated boron filaments are disposed uniformly about and in parallel relationship to the metal wire with said boron filaments being less in number at one end of the wire than at the other end and a plurality of resin impregnated carbon fibers are disposed as an outer layer on the boron filaments.

The instant invention is further concerned with the slender tapered product producible by the inventive process. In particular, the invention contemplates a solid, tapered composite rod having a tip size as small as 1/32 inch for fishing rods and the like comprising a wire core, preferably metal, extending the length of the rod, a plurality of boron filaments uniformly disposed about the wire and in parallel relation thereto, the boron filaments being less in number at one end of the wire than at the other end, and a plurality of carbon fibers uniformly disposed as an outer layer about the plurality of boron filaments and in parallel relation thereto, the wire, boron filaments and carbon fibers being embedded in and bonded to a cured resin matrix.

BRIEF DESCRIPTION OF THE DRAWINGS

An understanding of the invention will become more apparent to those skilled in the art by reference to the following detailed description when viewed in light of the accompanying drawings, wherein:

FIG. 1 is a side elevational view of apparatus useful in laying up the composite rod of the present invention;

FIG. 2 is a sectional view taken on line 2—2 of FIG. 1;

FIG. 3 is an end view of the composite rod after lay-up in the apparatus shown in FIG. 1;

FIG. 3a is an enlarged end view of a portion of FIG. 3;

FIG. 4 is an end view of the rod of FIG. 3 after rolling; and

FIG. 5 is a side elevational view, in section, of molding apparatus used with the composite rod during heating.

DETAILED DESCRIPTION OF THE PREFERRED EMBODIMENT

Referring now to FIGS. 1 and 2 there is shown an elongated form 10 having an axial channel 12 therein. At the base of the channel 12, there is provided a centrally located and axially extending guide slot 14 which runs the length of the form 10. A wire 16, preferably a metal wire such as a steel wire 0.010–0.020 inch in diameter, is laid in the guide slot 14 and loaded in tension by securing one end to a stationary object such as hook 18 and hanging a small weight 20, typically 1 to 2 pounds, to its other end. Other wire materials, so long as they are compatible with and adhere to the resin matrix material used, are of small diameters such as 0.010–0.020 inch, may be kept straight by tensile loading and are strong enough to withstand the production process techniques herein described, may also be used. Typical examples are copper wire, graphite yarn and cotton or silk filaments. In order to employ the wire 16 as a permanent mandrel from the outset as will hereinafter becomes clear, the guide slot has a depth which corresponds to approximately one-half the diameter of the wire 16. With the wire 16 positioned in the slot 14, a plurality of resin-impregnated high strength, high modulus, low density filaments 22 preferably in the form of a prepreg monolayer tape strip 24 are laid over the wire 16.

Filaments (or fibers — the two terms being used interchangeably herein) considered suitable are high modulus, high strength, low density filaments, i.e., those having an elastic modulus significantly greater than that of fiber glass but with similar or better strength and density. In particular, filaments which are preferred are those having an elastic modulus of at least approximately 15 million psi, a flexural strength of at least approximately 300,000 psi and a density no greater than approximately 0.15 lb/in$^3$, e.g., boron filaments, coated or uncoated, carbon or graphite fibers or filaments, silicon carbide filaments and organic filaments such as polymeric aromatic nylon sold by duPont under the trademark KEVLAR PRD 49. Most preferred are filaments of boron, carbon and KEVLAR PRD 49. The filaments, as indicated, are preferably in the form of a tacky prepreg tape, such as a boron-epoxy resin prepreg monolayer tape, typically one utilizing a plurality (e.g., 10) of 4 or 5.6 mil unidirectional boron filaments. The width of the tape utilized depends, of course, on the diameter of the rod section being fabricated. In general however, tapes ranging in widths from 1/16 to ⅛ inch are considered satisfactory for most fishing rod applications. It will be recognized, of course, that individual filaments may also be utilized, either precoated with resin or with the resin applied after filament emplacement.

Various heat curable resin compositions may be utilized as the filament matrix material. Resins considered useful are the epoxy resins including polyglydicyl ethers of polyhydric phenols and cycloaliphatic epoxy resins as well as cresol novolac epoxy resins.

With the tape strip 24 laid in the bottom of channel 12 over wire 16, it is secured in position by clamping one end thereof by suitable means such as thumb clamp 28. The tape is then compacted and forced into intimate contact with the aforesaid wire 16 by rolling a compaction roller 26 the length of the channel 12. Although a compaction plate may be utilized in lieu of the compaction roller, the latter is preferred because of the extremely high local pressure which can be obtained therewith and because of the tendency of the rolling action to straighten adjacent fibers. After the first strip has been rolled, the wire 16 and the strip are peeled from the form 10 and turned over so that a second strip 24 may be placed on the exposed side of the wire 16 and compacted. Additional tape strips 24 are successively laid up on the previous strip, clamped and compacted with the roller 26. After the desired number of tape strips are thus assembled, the composite assembly is turned over once more and the requisite and equal number of tape layers are laid up, clamped and compacted on the other side. As will be appreciated, it is during the lay-up procedure that the taper is built into the rod. Typically some or all filaments are eliminated from an end portion of a sequence of tape strips by trimming the end portion to a desired shape (e.g., diagonal, sawtooth) and/or length.

As an alternate technique, since at times the wire 16 may possess some twist and thus be difficult to retain in the slot 14 prior to laying up the initial tape strip 24, the strip may be laid in the bottom of channel 12 before the wire, with the wire then emplaced thereon. Also suitable is the technique wherein, prior to emplacing the wire 16 into the form 10, the wire is weighted and hung vertically and initial strips 24 are laid on opposite sides thereover.

The intermediate product resulting from the aforedescribed technique is green composite rod 30 as shown in FIG. 3. As will be noted, the product while being highly densified and having sufficient structural integrity for handling purposes, is rectangular in cross section. In order to achieve the typical and desired circular cross section, it is thus necessary to remove the rod 30 from the form 10 and roll it to the desired circular shape 32 as shown in FIG. 4. This may be done by manipulation between the thumb and forefinger of the hand or by rolling between opposed oscillating plates or by other suitable techniques.

After rounding to a circular cross section, additional successively shorter tape layers may be wrapped around the rod to continue the taper toward the large diameter end of the rod. Each tape layer has a width which is equal to the circumference of the underlying rod surface to assure complete coverage without overlap. In general, the tape layers are sawtoothed at their tip ends with successive layers being progressively shorter. The materials making up the initial tape layers are the same as used in the tape strips 24. As will be appreciated, the tape layers are applied to the rod with their filaments parallel to the rod axis. Although it is suitable to use only one type of high modulus, high strength, low density filament for making the entire rod, such as the boron filaments described, it is preferred to provide as the outermost layer a prepreg tape reinforced with lower modulus fibers, e.g., a graphite-epoxy prepreg tape. The final layer or layers are trapezoidal in shape and comprise tapes of resin reinforced with high modulus, high strength, low density filaments which have a strength approximately the same or higher than the boron filaments but which have an elastic modulus which is appreciably lower. Suitable as filaments in the final layers are graphite and KEVLAR.

Having graphite or KEVLAR filaments in the surface layer results in a more attractive product from an aesthetic viewpoint and one which can be made extremely smooth as by sanding. In addition, and perhaps more importantly, having graphite or KEVLAR filaments in the outer layer increases the flexural stress margin of safety since, as compared to boron, the graphite or KEVLAR filaments can better withstand high flexural loading because of their somewhat lower elastic modulus.

Having observed the details of initial fabrication, attention may now be given to the curing of the resin matrix material. As will be appreciated, during curing, the matrix resin between the filaments flows and the filaments, particularly those in the ends of the rod 32 have a tendency to wander. Although reasonable straightness can be achieved in curing by simply helically wrapping the green rod 32 with nonadherent tape strips over its entire length and then applying tension to the wire while the rod is curing in a vertical position, problems have been found to persist with this procedure. It has been found, for example, that during curing the rod ends have tended to lose concentricity with the wire 16. In addition, local rod warping has occurred, probably caused by uneven resin expansion and/or contraction during curing. Further, with significant wire tension, overall tip warping can result from relaxation of the wire mandrel after curing. Finally the utilization of this technique with relatively thick rod sections, has manifested a tendency for local lateral bulging to occur, probably due to entrapped air or water vapor.

In order to overcome these problems, it has been found necessary to completely encase the green rod within an embracing molding surface in such a manner so as to provide increased lateral and end support. As shown in FIG. 5, the ends of the rod 32 are snugly fitted within mold end caps 34, preferably of a material such as Teflon which will withstand cure temperatures without bonding to the rod. Each of the end caps 34 has a central axial opening 36 to accommodate the wire 16. Between the caps, the rod surface is completely wound with a binding tape 38, preferably of a material such as Teflon tape or cellophane ribbon or the like which will also withstand cure temperatures without bonding to the rod. In practice, in order to minimize resin leakage, it has been found advantageous to helically wrap first with Teflon tape and then, in the opposite helical direction, with cellophane type shrink tape.

The green rod, being totally encased in binding tape 38 and mold end caps 34, is positioned within a rigid hollow tube 40. It can be seen that if the entire assembly is oriented vertically and if the wire 16 is loaded in tension, the rod is concentric within the tube 40 and has its wound surface 38 in spaced relation to the inner walls thereof, the end caps acting as spacers for this purpose. The tube 40 is provided with a series of circumferentially spaced apertures 42 at its upper end which are located below the end walls of the upper cap 34. A filler cap 44 is slidably disposed on the upper end of the tube 40 to provide ingress into the tube through the apertures 42 of particulate material 46, such as glass beads or sand. The particulate material is relatively fine-grained for maximum lateral contact surface and provides a uniform contact pressue about the periphery of the rod throughout the contacted length as well as the lateral restraint needed to ensure alignment of the filaments during and after curing. In addition, its natural porosity permits the release of entrapped air or water vapor and will also act as a wick should any excess resin bleed from between the binding tape layers. Glass beads or similar spherical particulates are preferred over sand since the latter, although useful, comprise jagged-edged particles which do not compact as well as the smooth glass beads.

In operation, the wire 16 is threaded through the opening 36 in end caps 34 so that the end caps may be positioned over the ends of the composite rod. With the end caps in place, the binding tape 38 is applied over the entire surface of the intermediate portion of the rod between the aforesaid end caps. The encased rod is then positioned, by sliding, within the tube 40. An end plate 48 having an opening 50 through which the wire 16 is threaded, is secured upwardly against the bottom of the tube 40 by crimp cap 52, the upper looped end of wire 16 being supported, as by a hook from above and tensioned, as by a weight from below. While the weight of the tube and particulate material may provide sufficient tension to the wire, it is preferred to add more weight to eliminate any risk of movement during addition. With the filler cap 44 in place on the vertically oriented tube, the particulate material 46 is supplied therethrough to apertures 42 and thence to tube 40. Once the tube 40 is completely filled, the filler cap is removed, the apertures 42 are sealed with a high temperature adhesive tape and tension in the wire may be reduced or removed in order to eliminate the possibility of warping after cure due to residual stress in the wire. The entire assemblage which is now unitary and easy to handle is emplaced within an oven where the cure cycle satisfactory for the particular resin utilized, (typically: heat to 350° F in 15 minutes; hold for 2 hours) is accomplished. After curing, the encased rod is removed from the tube 40, the end caps are taken off and the binding tape 38 is unwrapped.

A plurality of slender, tapered solid composite rods (fly rod butt sections) ranging in length from 36 to 48 inches were made according to the invention. A typical butt section was 45 inches long and tapered from 5/32 inch diameter up to 7/32 inch diameter utilizing a 14–16 mil diameter soft annealed steel wire core. Boron-epoxy prepreg tapes 5/64 inch wide (containing approximately eleven 5.6 mil boron filaments) were used for the lay-up in the form 10. After removal from the form and rounding, several layers of additional monolayer boron-epoxy tape were wrapped around the rod. Finally, one layer of trapezoidally shaped monolayer graphite-epoxy tape was wrapped therearound. The cured rods were straight with filaments uniformly distributed about the wire mandrel throughout their length. A like number of tip sections of equal length as the butt sections above described were made using the same techniques. The tip sections tapered from 3/64 inch up to 5/32 inch.

What has been set forth above is intended primarily as exemplary to enable those skilled in the art in the practice of the invention and it should therefore be understood that, within the scope of the appended claims, the invention may be practiced in other ways than as specifically described.

I claim:

1. A method for making a solid tapered fiber-reinforced resin matrix composite rod having a high aspect ratio comprising:

forming a plurality of resin-impregnated fibers into a handleable green compact having the shape of a solid tapered composite rod of high aspect ratio;

completely encasing said green compact within an embracing flexible, releasable layer;

placing said green compact encased by said layer, within a rigid tube in spaced relation to walls thereof;

filling space between said encased compact and said tube with particulate material to apply uniform peripheral contact pressure to said compact along the length thereof; and heating said green compact to harden said resin.

2. The method of claim 1 wherein said encasing step includes wrapping at least one layer of flexible heat shrinkable material about said compact.

3. A method for making a high modulus, high strength, low density solid tapered composite rod comprising:

forming a plurality of resin-impregnated, high modulus, high strength, low density filaments uniformly about and in adhering parallel relationship to a wire to form a green composite rod, said filaments being less in number at one end of the wire than at the other end;

compacting said green rod to densify and shape it to a preselected configuration;

completely encasing said green rod within flexible, release layer;

placing said green rod, so encased, and said wire within a rigid tube in spaced relation to walls thereof; filling space between said encased rod and said tube with particulate material to apply uniform pressure along the length of said green rod; and heating said green rod to harden said resin.

4. The method of claim 3 wherein said rod is oriented with its axis vertical during said heating.

5. The method of claim 3 wherein said filaments are selected from the group consisting of boron, carbon and polymeric aromatic nylon.

6. The method of claim 3 including the step of removing said heated rod from said tube and removing said release layer.

7. The method of claim 6 additionally comprising: snugly fitting a first cap over one end of said green rod, snugly fitting a second cap and the other end of said rod and winding releasable tape over the entire surface of said green rod between said first and second caps.

8. A method for making a high modulus, high strength, low density tapered composite rod comprising the steps of;

disposing a plurality of resin-impregnated boron filaments uniformly about in adhering contact with, and in parallel relation to a metal wire, said filaments being less in number at one end of the wire than at the other end;

disposing a plurality of resin-impregnated carbon filaments as an outer layer on said boron filaments to form a green composite rod;

compacting said green rod to densify and shape it to a preselected configuration;

completely encasing said green rod within an embracing flexible release layer, placing said green rod so encased with a rigid tube in spaced relation to walls thereof;

filling space between said encased rod and said tube with particulate material to apply uniform peripheral contact pressure along the length of said rod sufficient to laterally restrain said rod during resin cure and thereby ensure alignment of said filaments; and heating said green rod to cure said resin.

9. The invention of claim 8 wherein said rod is oriented with its axis vertical during resin cure.

10. The invention of claim 9 including the steps of removing said heated rod from said tube and removing said release layer therefor.

11. The invention of claim 9 further including snugly fitting a first cap over one end of said green rod, snugly fitting a second cap over the other end of said green rod and winding releasable tape over the entire surface of said green rod between said first and said second caps.

* * * * *